Figure 1:
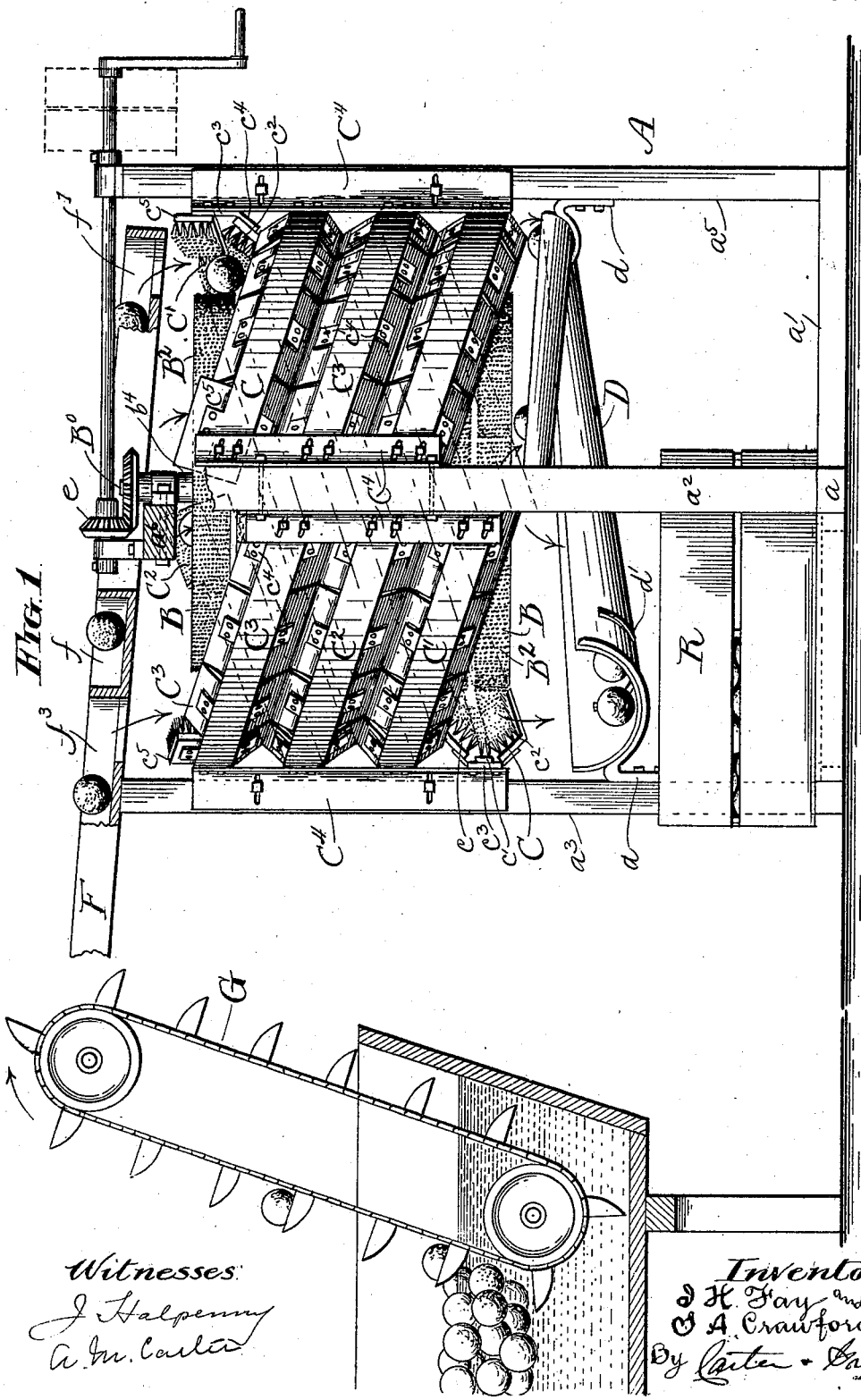

No. 665,201. Patented Jan. 1, 1901.
I. H. FAY & S. A. CRAWFORD.
MACHINE FOR CLEANING FRUIT.
(Application filed Dec. 21, 1898.)
(No Model.) 3 Sheets—Sheet 1.

No. 665,201. Patented Jan. 1, 1901.
I. H. FAY & S. A. CRAWFORD.
MACHINE FOR CLEANING FRUIT.
(Application filed Dec. 21, 1898.)
(No Model.) 3 Sheets—Sheet 2.

No. 665,201. Patented Jan. 1, 1901.
I. H. FAY & S. A. CRAWFORD.
MACHINE FOR CLEANING FRUIT.
(Application filed Dec. 21, 1898.)
(No Model.) 3 Sheets—Sheet 3.
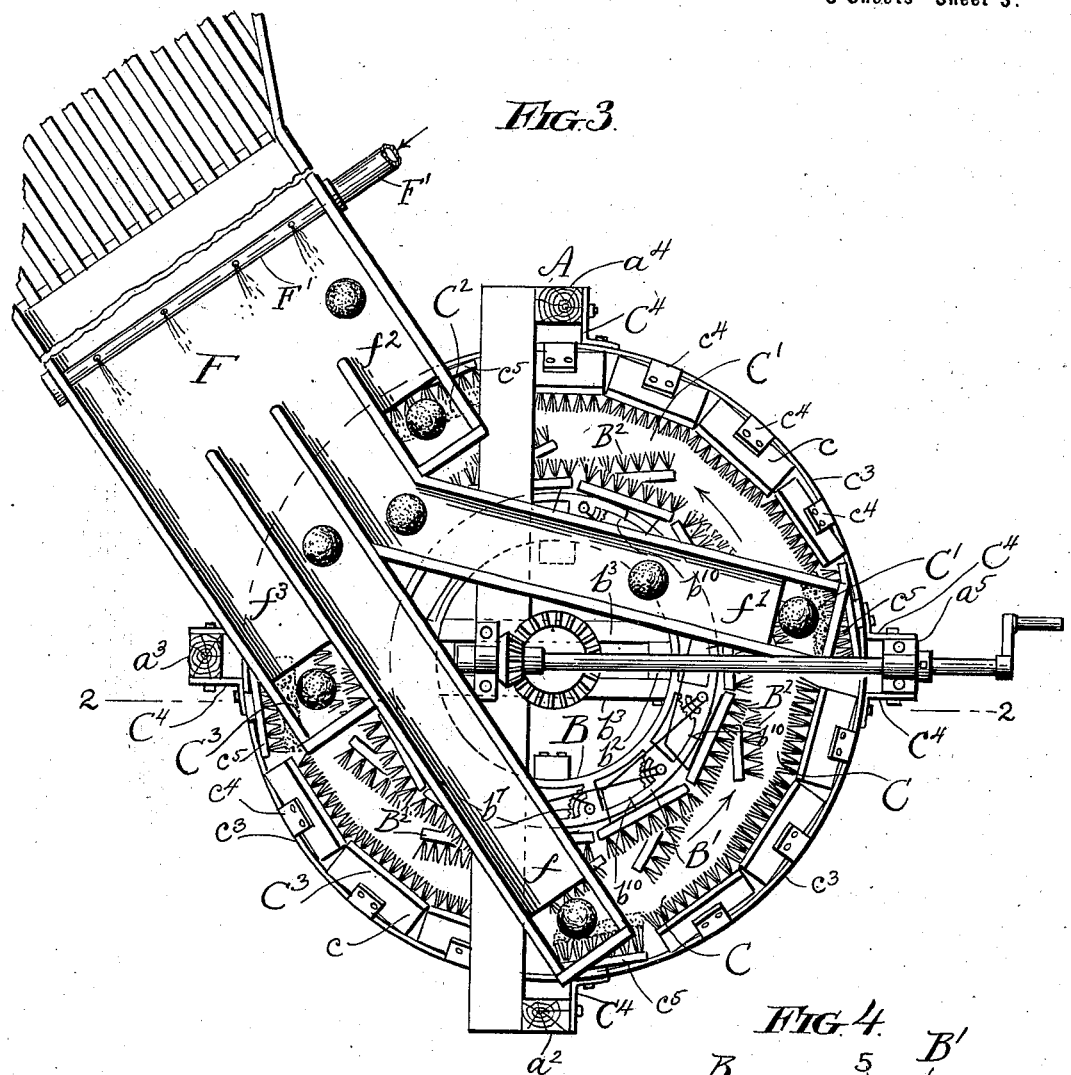
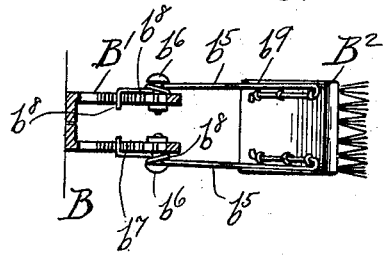
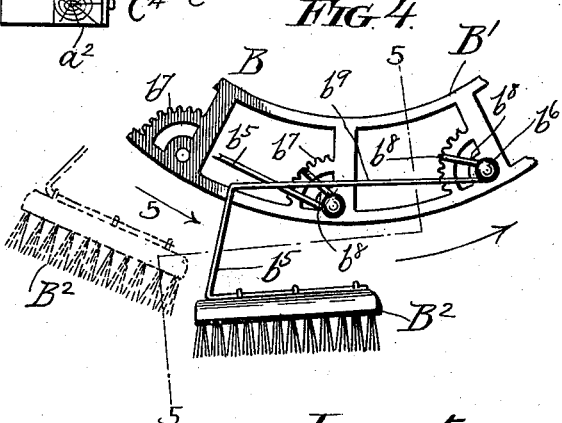
Witnesses:
J. Halpenny
A. M. Carter
Inventors:
I. H. Fay and
S. A. Crawford
By Carter & Graves
Atty's
THE NORRIS PETERS CO., PHOTO-LITHO., WASHINGTON, D. C.

UNITED STATES PATENT OFFICE.

IRVING H. FAY AND STANLEY A. CRAWFORD, OF RIVERSIDE, CALIFORNIA; SAID CRAWFORD ASSIGNOR TO FRED STEBLER, OF SAME PLACE.

MACHINE FOR CLEANING FRUIT.

SPECIFICATION forming part of Letters Patent No. 665,201, dated January 1, 1901.

Application filed December 21, 1898. Serial No. 699,914. (No model.)

*To all whom it may concern:*

Be it known that we, IRVING H. FAY and STANLEY A. CRAWFORD, of Riverside, in the county of Riverside and State of California, have invented certain new and useful Improvements in Fruit-Cleaning Machines, of which the following is a specification.

This invention relates to machines for cleaning fruit and the like, particularly oranges and lemons; and it has for its object to provide an improved machine of this character of greater capacity and efficiency than any heretofore constructed and capable of successful use in carrying on either a wet or dry cleaning process.

Our invention contemplates a machine in which one or more spiral channels or runways for the fruit are formed between an inner cylinder and surrounding casing that are arranged to rotate relatively to each other. Brush-surfaces are provided in said runways and act on the rind of the fruit to clean it as it rolls down through the runways and is spun about by the relative rotation of the cylinder and casing. In the approved form more particularly herein shown the inner cylinder is revolubly mounted upon a vertical shaft, while the outer casing is stationary and fixed in the supporting-framework of the machine. A number of channels or runways for the fruit extend spirally downward around the revolving cylinder, formed between it and the surrounding stationary casing, and a distributing-table over the cylinder is provided with an opening above the mouth of each runway to direct the fruit into the same, although it will be understood that with a reverse direction of rotation the fruit will be cleaned by being rolled up through the channels, in which case it will be fed into their lower instead of their upper ends. The distributing-table herein shown is arranged on an incline, so that fruit placed upon it will roll down naturally toward the several openings and be automatically distributed between them. Water for the wet-cleaning process is supplied in any suitable manner, but approvedly is discharged upon the distributing-table and falls through the openings with the fruit into the runways and upon their brushes. The latter are shown as yieldingly or spring supported in part, so as to lightly but thoroughly engage and brush off the fruit, notwithstanding any ordinary irregularities in its size and shape. Extreme variations in size, due to difference in the variety or species of the fruit, are, as a further improvement, provided for by a construction permitting the size of the channels or runways to be adjusted to the size of the particular fruit to be cleaned, and in this way a single machine is adapted for successful use in cleaning a wide variety of fruit products.

The invention consists in the improved construction involved in the features thus above referred to, and also in various further details more particularly hereinafter pointed out in connection with the following description of the machine illustrated in the accompanying drawings, in which—

Figure 2:
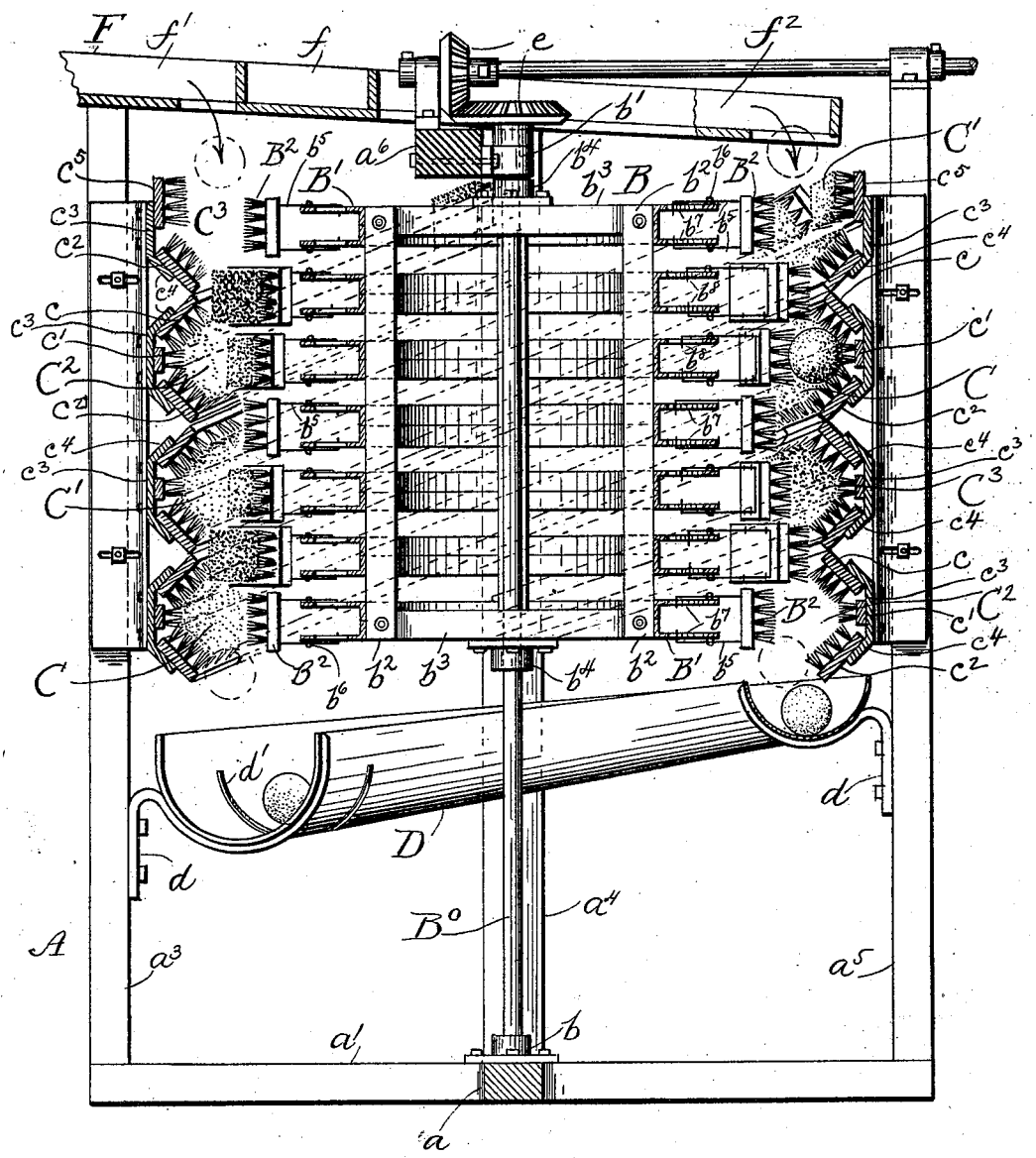

Figure 1 is a side elevation, with parts in section, of a fruit-cleaning apparatus embodying our invention in one form. Fig. 2 is a sectional elevation thereof. Fig. 3 is a top plan view thereof. Fig. 4 is a detail showing more clearly the manner of resiliently supporting the brushes on the rotary cylinder. Fig. 5 is a sectional detail thereof.

The supporting-frame A of the machine thus illustrated comprises crossed base-timbers $a$ and $a'$, having uprights $a^2$, $a^3$, $a^4$, and $a^5$ secured to their extremities. A vertical shaft $B^0$ is journaled in the center of the frame A, its lower end being shown as resting in a step-bearing $b$ at the intersection of the base-timbers $a$ and $a'$ and its upper end in a bearing $b'$, which is secured to the middle of a cross bar or timber $a^6$, that extends between the upper end of the uprights $a^2$ and $a^4$. Rigidly mounted on this shaft to rotate therewith is a drum or cylinder B, which, as herein shown, consists of a number of annular castings B', that are connected together in parallel relation concentrically to the shaft $B^0$ by longitudinal bars $b^2$, carried by pairs of cross-bars $b^3$, which embrace the shaft $B^0$ and are rigidly secured thereto by flanges $b^4$. The exterior of the cylinder B is a fruit-brushing surface formed in this instance by a plurality of separate brushes $B^2$. These are herein shown as resiliently supported upon springs $b^5$, which project from the annular castings B′, said springs being secured in pairs to the sides of the castings by pins $b^6$, from which they project first rearwardly, (considered with reference to the direction of rotation of the drum,) thence outwardly beyond the periphery of the castings, and finally forwardly, as shown, behind the brushes B², the backs of which are securely fastened to these forwardly-projecting spring ends. This method of mounting provides a greater resilience at the front end of the brush, due to the additional flexibility afforded by the final bend of the springs and enables the brush to engage the fruit lightly and delicately at first and then press harder until as the rear end of the brush passes over the fruit the full strength of the body of the spring is brought to bear upon it. As each brush comes in contact with a piece of fruit it will, moreover, be swung inward toward the drum at its free front end until it occupies a position lying at a marked angle with its normal position, which angle will gradually grow less as the brush is carried past the fruit and as its supporting-springs bend more and more at their points of attachment with the drum instead of at their angles adjacent to the brushes, the result being that the brushes pass over the fruit with a rocking movement, by reason of which they engage a greater area of the surface of the fruit and accomplish a more perfect cleaning operation. As a further improvement also the springs are secured to the drum in such a manner as to enable their tension to be adjusted as desired. To this end notched segments $b^7$ are shown as provided in the side flanges of the annular castings B′, concentric with the pins $b^6$, which secure the springs to said castings, and the inner ends $b^8$ of the springs after being wound around said pins are bent to engage between the teeth of said segments. The tension of the springs may thus obviously be adjusted by causing their inner ends to engage between different teeth of the segments. The main reach $b^9$ of the springs is also herein shown as projecting rearwardly in each case behind the pin $b^6$ of the next preceding spring, and said pin thus forms a stop by which the brush is prevented from being thrown outward to an undue extent.

Surrounding the cylinder B, concentrically and at a little distance therefrom, are a number (one or more) of spiral channels C, C′, C², and C³, herein shown as four in number and each about three-quarters of a full circumference in length, although it will be understood that their exact number and length are not a material matter. These channels, together with the cylinder B, form spiral runways, into the upper ends of which the fruit may be dropped and subjected to the continuous action of the brushes B² until it rolls out at their lower ends. They are each herein shown as made of three rows of brushes $c$, $c′$, and $c^2$, secured to the inner faces of curved plates $c^3$, that are carried between the uprights $a^2$, $a^3$, $a^4$, and $a^5$ of the main frame, the upper and lower brushes $c$ and $c^2$ being secured to lugs $c^4$, which project obliquely inward from the upper and lower edges of said plates. This places said upper and lower brushes at a marked angle to each other, with the middle brush $c′$ between them, and provides an inwardly-facing hollowing path, within which the fruit is constrained to travel by the adjacent brush-surface of the cylinder B, which thus forms, in effect, the inner sides of the runways. The effective size of the latter is furthermore herein shown as made variable to accommodate fruit of different kinds and sizes by making the plates $c^3$ in quadrants and securing them adjustably to adjustable brackets $C^4$ on the uprights. The several adjustments are in this instance afforded by bolt-and-slot connections, as shown, and it will be obvious that when bolts are loosened the quadrant-sections of the channels may be moved in toward or drawn out away from the cylinder B, so as to form a runway of smaller or larger cross-section, as desired.

A spiral trough D is supported within the main framework by brackets $d$ or otherwise in position to catch the clean fruit as it falls from the lower ends of the several runways and direct it into a receptacle or box R, placed beneath the lower end of the trough. In case water is used in the cleaning process one or more slots or other apertures $d′$ may be provided in the trough to drain off the water before it reaches the box R. Obviously in the absence of the trough D a receptacle for the fruit might be placed beneath each of the runways, but with less convenience and additional labor. The shaft $B^0$ may be rotated to revolve the drum B by hand or power, as found convenient, and by any suitable mechanism, that herein shown comprising beveled gears $e$, which transmit motion from a counter-shaft E, journaled on top of the framework, a suitable crank or driving-pulleys or their equivalent being provided on the end of said counter-shaft for rotating the latter.

The fruit may be fed into the upper ends of the runways by any suitable means; but, as herein shown, devices are provided for automatically distributing it without additional labor beyond that required to raise the fruit to the top of the machine. This includes a slightly-inclined table F, which terminates at its lower end in a number of chutes $f$, $f′$, $f^2$, and $f^3$, which terminate above the mouths of the runways or channels C, C′, C², and C³, respectively. The fruit deposited upon the rear upper end of the table rolls down the incline toward the chutes and becomes scattered across the width of the table, and thus distributes itself between the chutes with approximate uniformity. To permit the fruit to readily enter the runways, the brushes B² around the upper edge of the cylinder are shown as tied back against the castings B′ by wires $b^{10}$ or otherwise, and the uppermost brushes $c^5$ of the channels C, C', $C^2$, and $C^3$ are placed vertically instead of being inwardly inclined, as in the case of the other brushes of the uppermost row of each channel, and in this manner ample space is provided for the entrance of the fruit. Any suitable elevating mechanism G may be used for raising the fruit to the table F, or it may be dumped upon the table by hand. Water may also be supplied upon the table through a pipe F', communicating with any suitable source of supply and will run down through the chutes and upon the brushes of the runways, thereby subjecting the fruit to a washing process as well as to a thorough brushing, and in case it is found desirable the fruit may be floated in a tank H before being lifted to the table F by the elevating mechanism G or the like. In the latter case the provision of an additional water-supply through the pipe F' may not be necessary.

The operation of the machine thus described is found to be particularly effective, owing to the fact that the fruit in rolling down the runways is given a twisting movement which brings every portion of its surface into contact with the brushes and insures its thorough cleaning, especially around the stems, where the greatest accumulation of dirt occurs. Owing to its peculiar construction also the capacity of the machine is relatively very great as compared with previous devices of this character.

It will be understood that changes in the various details of construction and arrangement may be made without departing from the broad spirit of the invention and claims.

We claim as our invention—

1. A fruit-cleaning machine comprising a supporting-framework, a cylinder mounted within said framework, spiral channels mounted in the framework around the cylinder so as to form runways about the same, brush-surfaces in said runways, and means for effecting relative rotation between the cylinder and channels, substantially as described.

2. A fruit-cleaning machine comprising a supporting-framework, a cylinder mounted within said framework to rotate upon a vertical axis, spiral channels fixed within said framework and surrounding said cylinder, brushing-surfaces in said channel, resiliently-mounted brushes on the exterior of said cylinder, and means for rotating the cylinder, substantially as described.

3. A fruit-cleaning machine, comprising a cylinder, a casing surrounding said cylinder, the cylinder and casing being revoluble relatively to each other and having a number of spiral runways formed between them, brushing-surfaces in said runways, means for actuating the revolving part, and an inclined distributing-table having discharge-openings above the mouths of the runways, substantially as described.

4. A fruit-cleaning machine, comprising a cylinder, a casing surrounding said cylinder, the cylinder and casing being revoluble relatively to each other and having a number of spiral runways formed between them, brushing-surfaces in said runways, means for actuating the revoluble part, a distributing-table having openings above the mouths of the runways, and a water-supply pipe discharging upon said distributing-table.

5. A fruit-cleaning machine provided with a cylinder, fruit-conveying channels arranged around the cylinder, springs secured to said cylinder at one end and left free at the other end, said springs extending tangentially rearward from their point of attachment and being then reversely bent outwardly and forwardly, and brushes secured to the forwardly-projecting free ends of the springs, substantially as described.

6. In a fruit-cleaning machine, the combination with a relatively revoluble cylinder, of springs secured to the periphery of said cylinder, brushes resiliently mounted on said springs, and means for adjusting the tension of said springs, substantially as described.

7. In a fruit-cleaning machine, the combination with a relatively revoluble cylinder, of springs pinned to the periphery of said cylinder, toothed segments on the cylinder concentric to the securing-pins, inwardly-bent ends on the springs adjustably engaging said toothed segments, and brushes secured to the opposite ends of the springs, substantially as described.

8. A fruit-cleaning machine comprising a supporting-frame; a cylinder mounted within said frame and furnished with brush-surfaces; a spiral channel mounted in the frame around the cylinder so as to form a runway about the same; and means for effecting relative rotation between the said brush-surfaces and runway, substantially as described.

In testimony that we claim the foregoing as our invention we affix our signatures hereto, in the presence of two subscribing witnesses, this 9th day of November, A. D. 1898.

IRVING H. FAY.
   STANLEY A. CRAWFORD.

Witnesses:
 T. D. HURD,
 MYRON MILICE.